United States Patent
Misulia et al.

(10) Patent No.: US 11,682,373 B2
(45) Date of Patent: Jun. 20, 2023

(54) INTERLEAF PACKING AND DEPLOYMENT SYSTEM

(71) Applicant: Raytheon Company, Waltham, MA (US)

(72) Inventors: Joseph M. Misulia, Attleboro, MA (US); Curtis B. Carlsten, Seekonk, MA (US); Peter M. Willey, Rumford, RI (US)

(73) Assignee: Raytheon Company, Waltham, MA (US)

( * ) Notice: Subject to any disclaimer, the term of this patent is extended or adjusted under 35 U.S.C. 154(b) by 457 days.

(21) Appl. No.: 16/829,033

(22) Filed: Mar. 25, 2020

(65) Prior Publication Data

US 2021/0302605 A1 Sep. 30, 2021

(51) Int. Cl.
*G10K 11/00* (2006.01)
*G01V 1/38* (2006.01)
(Continued)

(52) U.S. Cl.
CPC ............ *G10K 11/006* (2013.01); *G01V 1/16* (2013.01); *G01V 1/168* (2013.01); *G01V 1/3843* (2013.01);
(Continued)

(58) Field of Classification Search
CPC .... G10K 11/006; G10K 11/008; G01V 1/168; G01V 1/3843; G01V 1/38
(Continued)

(56) References Cited

U.S. PATENT DOCUMENTS 4,999,816 A 3/1991 Dale et al.
5,257,243 A 10/1993 Dechico et al.
(Continued)

FOREIGN PATENT DOCUMENTS

GB 1525422 9/1978
WO 2015/092066 6/2015

OTHER PUBLICATIONS

International Search Report and Written Opinion dated May 10, 2021 in Corresponding International Application No. PCT/US2021/013808.
(Continued)

*Primary Examiner* — Ian J Lobo
(74) *Attorney, Agent, or Firm* — Renner, Otto, Boisselle & Sklar, LLP (57) ABSTRACT

A packing module includes a volumetrically efficient structure for separately retaining sensors and a cable of a sensor array. The packing module includes a tray that supports the sensors and a retaining leaf arrangement that extends outwardly from the tray to retain the cable on the tray. The retaining leaf arrangement includes a plurality of nested leaves that are spaced relative to each other. Packing the module includes placing the sensors separately and in succession on the tray and inserting a portion of the cable in the retaining leaf arrangement in between each placing of a sensor. The placement of a sensor and insertion of a portion of the cable occurs alternately until the entire sensor array is accommodated. Deployment of the sensor array may occur by alternately removing a sensor and a portion of the cable until the sensor array is displaced from the module.

19 Claims, 6 Drawing Sheets

(51) Int. Cl.
    *G01V 1/16* (2006.01)
    *G01V 1/18* (2006.01)
    *G01V 1/20* (2006.01)
    *H04R 1/08* (2006.01)
(52) U.S. Cl.
    CPC .............. *G01V 1/186* (2013.01); *G01V 1/201* (2013.01); *H04R 1/08* (2013.01)
(58) Field of Classification Search
    USPC ........................................................ 367/3–5
    See application file for complete search history.

(56) References Cited

U.S. PATENT DOCUMENTS

| | | | | |
|---|---|---|---|---|
| 8,328,467 B2 * | 12/2012 | Thompson | ........... | G01V 1/3852 |
| | | | | 405/169 |
| 10,620,333 B2 * | 4/2020 | Dons | ................... | G01V 1/3852 |
| 2016/0327640 A1 | 11/2016 | Seite et al. | | |

OTHER PUBLICATIONS

International Preliminary Report on Patentabilty dated Sep. 22, 2022, in corresponding International Application No. PCT/US2021/013808.

* cited by examiner

INTERLEAF PACKING AND DEPLOYMENT SYSTEM

FIELD OF THE INVENTION

The invention relates to a system and method of packing and deploying hydrophone line arrays.

DESCRIPTION OF THE RELATED ART

Various applications may use sensor arrays. An exemplary sensor array includes a hydrophone array, such as a hydrophone line array. A hydrophone array may be implemented in a sonobuoy that is dropped or ejected from an aircraft, ship, or a land vehicle. The array may be dropped into an environment for surveillance. For example, the sensor array may be dropped in the ocean for underwater acoustic research. A sonobuoy that houses a hydrophone array may be used in military applications, such as in anti-submarine warfare. Sonobuoys typically have a small size such that packing a hydrophone line array in the sonobuoy presents challenges. For example, the outer diameter of a hydrophone may be ten times larger than the outer diameter of a cable for the array. Conventional cable packing and winding methods are deficient in that the conventional methods are unable to accommodate both the cable having a smaller diameter and the hydrophone having a larger diameter relative to the cable.

A prior attempt to package and deploy vertical hydrophone array includes using spiral interlocking packs. However, using a spiral interlocking pack is deficient in that the array cable itself acts as a locking mechanism. Consequently, stress is imparted into the cable and failure of the cable may occur.

SUMMARY OF THE INVENTION

A packing module according to the present application uses a volumetrically efficient structure for separately retaining sensors and a cable of a sensor array. The packing module includes a tray that supports the sensors and a retaining leaf arrangement that extends outwardly from the tray to retain the cable on the tray. The retaining leaf arrangement includes a plurality of nested leaves that are spaced relative to each other. Packing the module includes placing the sensors separately and in succession on the tray and inserting a portion of the cable in the retaining leaf arrangement in between each placing of a sensor. The placement of a sensor and insertion of a portion of the cable occurs alternately until all of the sensors and the entirety of the cable is accommodated by the packing module. Deployment of the sensor array may occur similarly to the packing method in that a single sensor may be displaced from the tray, followed by the removal of a portion of the cable from the retaining leaf, and so on, until all of the sensors and the entirety of the cable is displaced from the tray.

The tray and the retaining leaf arrangement may be formed integrally as a monolithic component. The retaining leaf arrangement may be formed proximate a central axis of the tray and the packing module, such that the cable is surrounded by the sensors when assembled, or the retaining leaf arrangement may be formed proximate an outer perimeter of the tray, such that the cable surrounds the sensors which are packed toward the middle of the tray. The retaining leaf arrangement and tray may be sized to accommodate any number of sensors or sensors having any size, and a cable having any length or size, as required for a particular application.

The packing module may be modular and include a plurality of sub-modules that each include a tray and a retaining leaf arrangement. The sub-modules may be axially stacked to form the packing module and any number of sub-modules may be provided to accommodate a sensor array for a particular application. In an exemplary application, the sub-modules may be vertically stacked such that during deployment, the sub-modules may be sequentially emptied from an uppermost sub-module to a lowermost sub-module, or vice versa. Trays of adjacent sub-modules may be releasably connected via a flexible interlock formed on the tray.

Using the packing module is advantageous in that the packing module provides a volumetrically efficient structure suitable for spaced-constrained applications, such as in an A-size sonobuoy. The packing module may have any suitable geometry and size to accommodate different sensor array geometries that are used in different applications. The retaining leaf arrangement prevents the cable from being tangled, knotted, or overly stressed during packing or deploying the sensor array, and during storage of the sensor array. Thus, using the retaining leaf arrangement is advantageous as compared with conventional mandrel-wound packing methods that may result in damage to the cable. The tray is also configured to retain the sensors in an ordered arrangement to prevent damage to the sensors.

According to an aspect of the invention, a packing module includes a support structure configured to separately retain sensors from a cable in a sensor array.

According to an aspect of the invention, a packing module includes a plurality of nested leaves that retain a cable of a sensor array.

According to an aspect of the invention, a packing module includes a tray and a retaining leaf arrangement for a sensor array.

According to an aspect of the invention, a packing module includes a plurality of releasably connected sub-modules that each include a tray and a retaining leaf arrangement for a sensor array.

According to an aspect of the invention, a packing module for a sensor array is configured to accommodate a sensor array in a minimal volume.

According to an aspect of the invention, a packing and deployment system includes a packing module.

According to an aspect of the invention, a packing module for a sensor array having a plurality of sensors connected by a cable includes at least one tray configured to support the plurality of sensors, and a retaining leaf arrangement that extends outwardly from the at least one tray and is configured to retain the cable on the at least one tray separately from the plurality of sensors.

According to an embodiment of any paragraph(s) of this summary, the retaining leaf arrangement includes a plurality of leaves that are nested.

According to an embodiment of any paragraph(s) of this summary, the plurality of leaves are evenly spaced relative to each other.

According to an embodiment of any paragraph(s) of this summary, each of the plurality of leaves have a same thickness and a same axial height relative to the at least one tray.

According to an embodiment of any paragraph(s) of this summary, each of the plurality of leaves has a progressively increasing outer perimeter in a direction away from a central axis of the retaining leaf arrangement.

According to an embodiment of any paragraph(s) of this summary, the at least one tray includes a plurality of trays that are axially stacked and are each configured to support a same predetermined number of the plurality of sensors.

According to an embodiment of any paragraph(s) of this summary, the at least one tray includes a plurality of trays that are axially stacked and are each configured to support a same predetermined number of the plurality of sensors.

According to an embodiment of any paragraph(s) of this summary, the packing module includes a plurality of flexible interlocking tabs that secure one of the plurality of trays to an adjacent one of the plurality of trays.

According to an embodiment of any paragraph(s) of this summary, each of the flexible interlocking tabs is formed integrally with a corresponding one of the plurality of trays.

According to an embodiment of any paragraph(s) of this summary, the packing module defines an axial slot extending through the retaining leaf arrangement for accessing the cable.

According to an embodiment of any paragraph(s) of this summary, the at least one tray includes an outer wall and the retaining leaf arrangement includes a plurality of inner leaves that define a cavity between the outer wall and the plurality of inner leaves, wherein the cavity is configured to receive the plurality of sensors.

According to an embodiment of any paragraph(s) of this summary, the cavity has an axial width that is at least ten times greater than a spacing between leaves of the retaining leaf arrangement.

According to an embodiment of any paragraph(s) of this summary, the retaining leaf arrangement defines an interior cavity that is surrounded by the retaining leaf arrangement and configured to receive the plurality of sensors.

According to an embodiment of any paragraph(s) of this summary, the tray and the leaf arrangement are integrally formed as a monolithic body.

According to an embodiment of any paragraph(s) of this summary, the at least one tray and the retaining leaf arrangement are cylindrical in shape.

According to an embodiment of any paragraph(s) of this summary, the retaining leaf arrangement includes a plurality of concentrically arranged leaves that each have a progressively increasing diameter in a radially outward direction.

According to another aspect of the invention, a packing and deployment system is used for a hydrophone array having a plurality of sensors connected by a cable. The packing and deployment system includes a plurality of axially stacked trays that are each configured to support a set of the plurality of sensors, wherein the plurality of axially stacked trays are releasably connected to each other, and a plurality of retaining leaf arrangements that are each arranged on a corresponding one of the plurality of vertically stacked trays and extend outwardly from the one of the plurality of vertically stacked trays, wherein each of the plurality of retaining leaf arrangements is configured to retain the cable on the corresponding one of the plurality of vertically stacked trays separately from the plurality of sensors.

According to an aspect of the invention, a method of packing and deploying a sensor array having a plurality of sensors connected by a cable includes placing a plurality of sensors separately and in succession on a tray configured to support the plurality of sensors, and inserting the cable in a retaining leaf arrangement that extends outwardly from the tray in between each placing of one of the plurality of sensors, the retaining leaf arrangement being configured to retain the cable separately from the plurality of sensors.

According to an embodiment of any paragraph(s) of this summary, the method includes inserting the cable in the retaining leaf arrangement includes sequentially wrapping the cable around a plurality of leaves that are nested.

According to an embodiment of any paragraph(s) of this summary, the method includes axially stacking a plurality of trays that each support a set of the plurality of sensors, and interlocking the plurality of trays flexible interlocking tabs.

According to an embodiment of any paragraph(s) of this summary, the method includes deploying the sensor array, wherein the deploying includes alternately releasing one of the plurality of sensors and removing the cable from the retaining leaf arrangement until all of the plurality of sensors and an entirety of the cable are displaced from the tray.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have particular application in systems used for sensing extremely large environments or environments that are not easily accessible. Examples of environments in which a sensing system or array may be used include underwater, air, and space. The packing module and method disclosed herein may be used for packing and deploying sensors in a particular environment. Military applications, such as anti-submarine warfare, or non-military applications, such as underwater acoustic research applications may be suitable applications. In an exemplary application, a sonobuoy that includes a hydrophone array having any size may be suitable, and more particularly, a small-size or "A-size" sonobuoy for deploying a hydrophone line array may be suitable. The hydrophone array may be deployed into the ocean from any suitable platform, such as an aircraft, sea vessel, or land vehicle. The packing and deployment system and method disclosed herein may be used with many other sensor systems, environments, and platforms.

Figure 1:
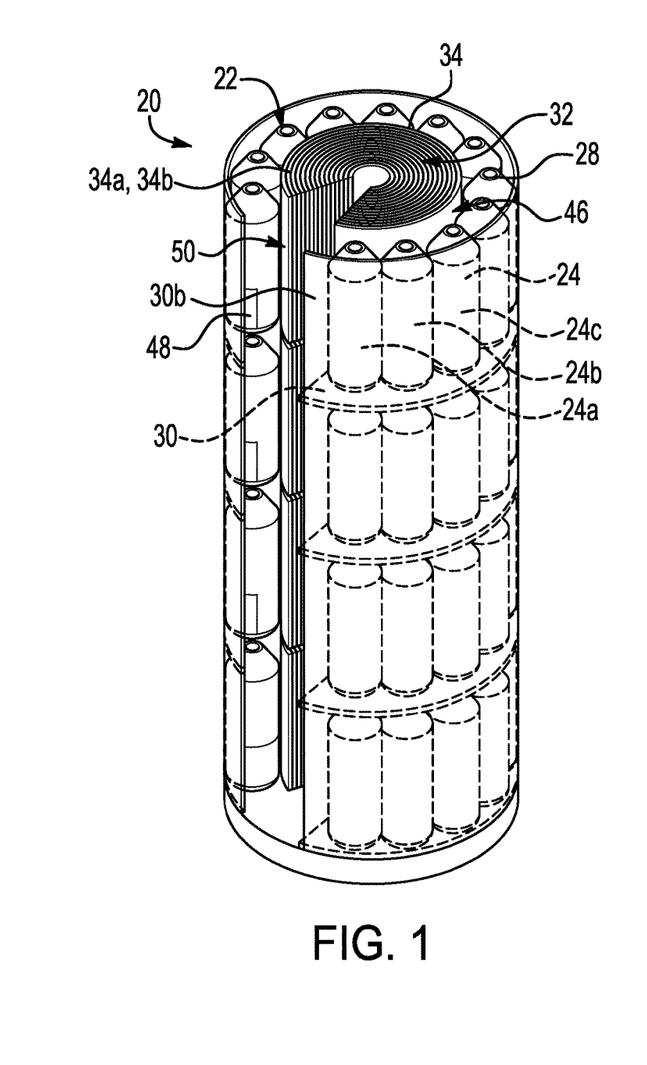
FIG. 1 shows an oblique view of a packing module for a sensor array according to an exemplary embodiment of the present application.
Figure 2:
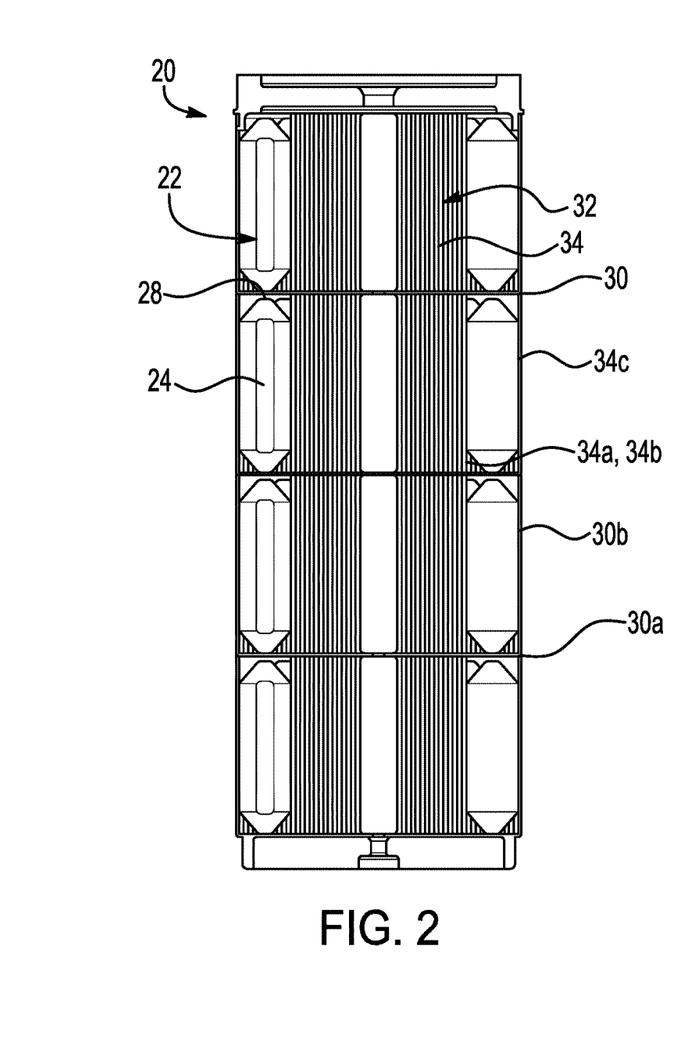
FIG. 2 shows a sectional view of the packing module of FIG. 1.
Figures 3, 4:
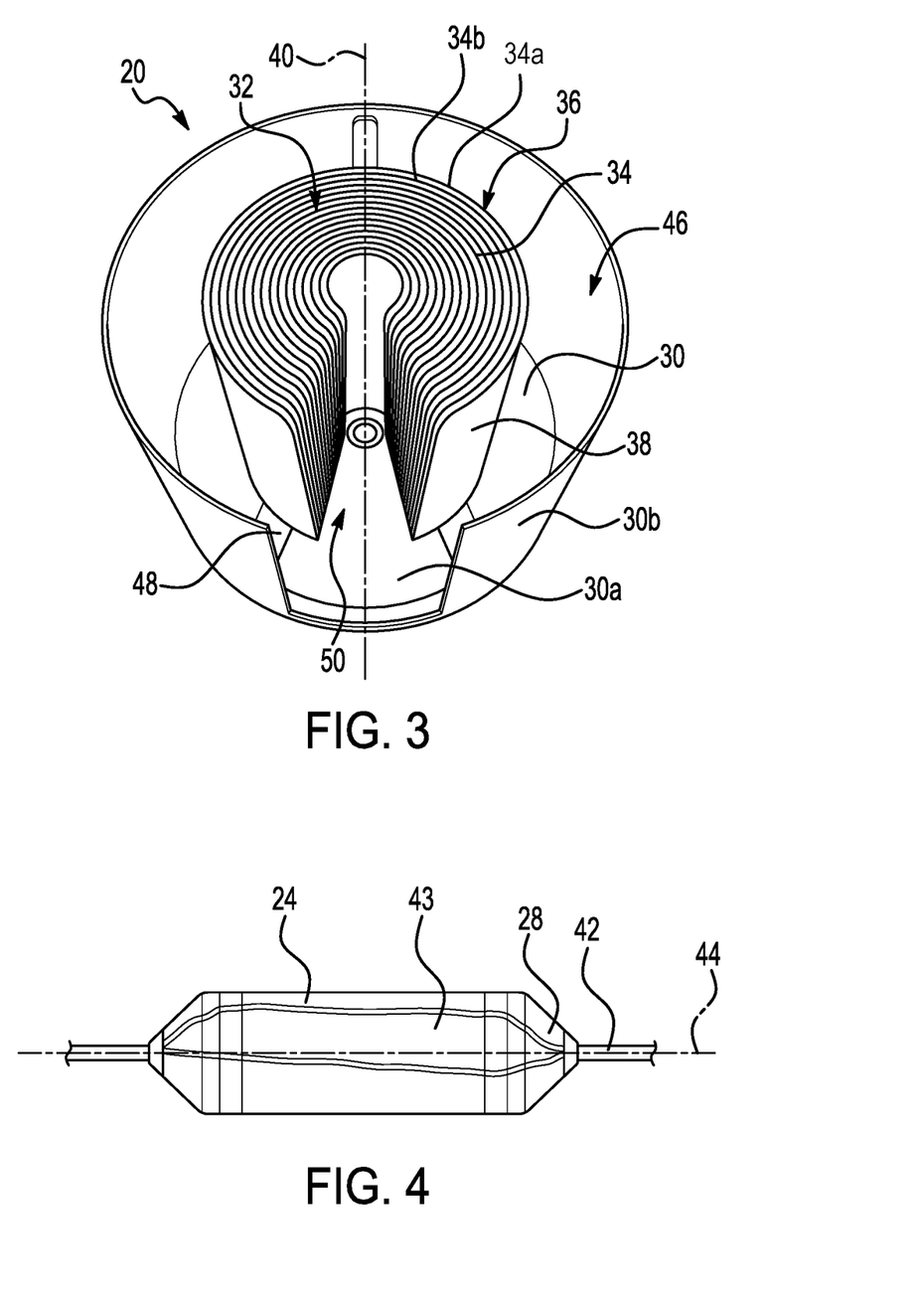
FIG. 3 shows a top oblique view of a sub-module of the packing module of FIG. 1.
FIG. 4 shows an exemplary sensor to be accommodated in the packing module of FIG. 1.

Referring first to FIGS. 1-3, a packing module 20 for a sensor array 22 having a plurality of sensors 24 connected by a cable is shown. FIGS. 1 and 2 show the sensor array 22 without the cable such that details of the packing module 20 may be seen. In an exemplary embodiment, the sensor array 22 may be a hydrophone line array and the sensors 24 may be hydrophones, such as piezoelectric transducers. Other sensors may be suitable for the sensor array 22, such as other acoustic sensors or optical sensors. Sensors that are configured to detect other environmental characteristics may also be suitable. For example, suitable sensors include sensors that detect pressure, temperature, or depth or distance. Each sensor 24 is connected to an adjacent sensor by a portion of the cable extending between axial ends 28 of the sensors 24 such that the cable protrudes from each opposite axial ends of a single sensor 24 to form a line array of sensors 24.

The packing module 20 includes at least one support structure, or tray 30 configured to support the plurality of sensors 24 such that each sensor 24 is seated on the tray 30 when the packing module 20 is assembled. A retaining leaf arrangement 32 extends outwardly from the at least one tray 30, or normal to the tray 30, and is configured to retain the cable separately from the plurality of sensors 24. FIG. 3 shows a single tray 30 having the retaining leaf arrangement 32 and FIG. 1 shows a plurality of trays 30 that each have a corresponding retaining leaf arrangement 32. The retaining leaf arrangement 32 includes a plurality of axially extending leaves 34 that are nested such that a cable-receiving space 36 is defined between two adjacent leaves 34a, 34b. For example, the cable-receiving space 36 may be defined between an outer leaf 34a and an inner leaf 34b that is closer to a center of the tray 30 relative to the outer leaf 34a.

The leaves 34 are formed as thin walls of material and the leaves 34 may be formed integrally with the tray 30 as a monolithic component. Any material may be suitable for forming the tray 30 and the leaves 34. A plastic material may be suitable, such as a thermoplastic material. The packing 20 may be formed by a 3D printing process. Other manufacturing processes, such as injection molding, may also be suitable for forming the tray 30 and the retaining leaf arrangement 32.

The leaves 34 may be evenly spaced relative to each other and the spacing is dependent on the size of the cable to be accommodated between the leaves 34. The spacing may be between 0.25 and 2.0 centimeters (between 0.1 and 0.8 inches) or sized up to accommodate a larger cable. Each leaf 34 may have a same thickness and a same axial height relative to the tray 30. The thickness may be less than a centimeter, or greater to accommodate a larger cable. The axial height of the leaves 34 may be dependent on the length of the sensor 24 which may extend in an axial direction when the sensors 24 are seated on the tray 30. The axial height may be selected to be nearly the same length as the length of the sensors 24 for accommodating the sensors 24 in a minimal volume.

An outer perimeter 38 of each leaf 34 may progressively increase along the retaining leaf arrangement 32 in a direction outwardly from a central axis 40 that is defined by a center of the tray 30 of the packing module 20. The leaves 34 may be formed independently such that adjacent leaves 34 do not contact each other. All of the leaves 34 are connected to the same tray 30. The number of leaves 34 will be dependent on the size of the sensor array 22 and the size of the cable to be accommodated between the leaves 34. Any number of leaves 34 may be suitable, such as between 10 and 20 leaves. Fewer than 10 and more than 20 leaves may be used for particular applications.

Referring in addition to FIG. 4, an exemplary sensor 24 of the sensor array 22 is shown. The sensor 24 is in the form of a hydrophone and includes the cable 42. A sensor body 43 of the sensor 24 contains the sensor electronics and defines a central axis 44 of the sensor 24. The cable 42 extends from each axial end 28 of the sensor body 43. As shown in FIG. 1, the sensors 24 may be arranged along the tray 30 such that the central axis 44 of each sensor 24 is parallel with the central axis 40 of the packing module 20. In an exemplary embodiment, the sensors 24 and the packing module 20 may be cylindrical in shape such that the central axes 40, 44 are parallel longitudinal axes. Other geometries may be suitable for the packing module 20.

In the embodiment in which the sensors 24 and the packing module 20 are cylindrical, as shown in FIGS. 1-3, the tray 30 may be disk-shaped and have a thickness that is less than a diameter of the tray 30. The retaining leaves 34 may be annular in shape and concentric with the tray 30. In particular applications, for example, when the packing module 20 is vertically deployed in the ocean toward the bottom of the ocean, the packing module 20 may have a substantially vertical orientation such that the sensors 24 and the retaining leaf arrangement 32 extend in a vertical direction.

When packing the sensor array 22 in the packing module 20, the sensors 24 are arranged separately and in succession. Each sensor 24 is supported on the tray 30 and may be placed in a same orientation relative to the tray 30. The sensors 24 are sequentially placed along the tray 30 such that each sensor 24 is adjacent two other sensors 24. A sensor 24a arranged at the beginning or end of the packing sequence may only be directly adjacent to one sensor 24. The cable 42 is inserted in the retaining leaf arrangement 32 in between each placing of one of the sensors 24. Accordingly, as best shown in FIG. 1, a first sensor 24a is placed on the tray 30 and a portion of the cable 42 extending from the first sensor 24a to an adjacent second sensor 24b is inserted into the retaining leaf arrangement 32. The cable 42 may be wrapped around the retaining leaf arrangement 32 until the portion of the cable 42 and thus the second sensor 24b reaches an empty position on the tray 30 next to the first sensor 24a. The second sensor 24b is then placed on the tray 30 and a portion of the cable 42 extending from the second sensor 24b to a third sensor 24c is then wrapped around the retaining leaf arrangement 32 until the third sensor 24c is able to be positioned adjacent the second sensor 24b.

The alternating placing of the sensors 24 and wrapping of the cable 42 occurs until the tray 30 is full of a predetermined number of sensors 24 as defined by the size of the tray 30 or until all of the sensors 24 and an entirety of the cable 42 is accommodated on the tray 30. The tray 30 may be sized to accommodate any number of sensors. For example, between 10 and 15 sensors 24 may be placed on a single tray 30. Fewer than 10 or more than 15 sensors 24 may be placed on the tray 30 in other applications. In an exemplary embodiment, the cable 42 may be approximately 304 meters (1000 feet) and a sensor 24 may be arranged approximately every 6 meters (20 feet) along the cable 42. Any number of sensors 24 may be used. For example, between 40 and 50 sensors 24 may be used. Fewer than 40 or more than 50 sensors may be used in other applications.

The packing module 20 including the retaining leaf arrangement 32 is advantageous in that the cable 42 is retained separately from the sensors 24 on the tray 30. The retaining leaf arrangement 32 enables the sensor array 22, such as a hydrophone line array to be accommodated with volumetric efficiency which is particularly advantageous in small size applications, such as in A-size sonobuoys. The packing module 20 may be sized up or down and varied in geometry to accommodate different sensor arrays used in various applications. The geometry of the packing module 20 is formed to ensure accommodation of the sensor array using a minimal volume. In addition to improving the volumetric packing for the sensor array 22, the configuration of the sensors 24 and the cable 42 provided by the packing module 20 also enables the sensors 24 to be sequentially deployed from the packing module 20 without overly stressing the cable 42. Still another advantage of the packing module 20 is that the arrangement locates the sensors 24 on the tray 30 to prevent damage to the sensors 24.

In the exemplary embodiment of the packing module 20 shown in FIGS. 1-3, the retaining leaf arrangement 32 is arranged proximate the central axis 40 of the packing module 20 such that, when assembled, the cable 42 is surrounded by the sensors 24. The tray 30 includes a base portion 30a and an outer wall 30b that extends normal or upward from the base portion 30a. The base portion 30a is planar in shape. The outer wall 30b is axially spaced relative to a plurality of inner leaves 34a, 34b of the retaining leaf arrangement 32 to define a cavity 46 therebetween. The outer wall 30b forms an outermost surface of the packing module 20. The outer wall 30b may be formed to have a stop tab 48 that projects inwardly from the outer wall 30b toward the central axis 40 of the packing module 20. The stop tab 48 may be used to locate or position the sensors 24 when the sensors 24 are placed on the tray 30.

The cavity 46 is formed to accommodate the sensors 24 and is sized based on a size of the sensors 24. The axial spacing between each of the inner leaves 34a, 34b is equal and the axial spacing of the inner leaves 34a, 34b is smaller than the axial width of the cavity 46. The ratio between the size of the cavity width and the axial spacing is similar to the ratio between the size of the diameter of the sensors 24 and the width of the cable 42. In an exemplary embodiment, the axial width of the cavity 46 may be at least 10 times greater than the axial spacing between the inner leaves 34a, 34b. When the sensors 24 are arranged on the base portion 30a of the tray 30, the sensors 24 are surrounded by the outer wall 30b of the tray 30. In an exemplary embodiment in which the packing module 20 is cylindrical in shape, the sensors 24 may be radially interposed between the retaining leaf arrangement 32 and the outer wall 30b of the base 30. The sensors 24 are shown as being arranged in a one-by-one placement proximate the perimeter of the tray 30. In other exemplary embodiments, the sensors 24 may be arranged in a two-by-two placement, or more, such that the cavity 46 may be sized to have a larger axial width to accommodate pairs of sensors 24 being arranged adjacent each other. In still another exemplary embodiment, the sensors 24 may be placed on the tray 30 in a horizontal orientation such that the tray 30 and the retaining leaf arrangement 32 are shaped to form a cavity 46 configured to accommodate the horizontal orientation of the sensors 24.

As best shown in FIGS. 1 and 3, the packing module 20 defines an axial slot 50 that, when the packing module 20 is assembled, opens to the cable 42 to enable access to the cable 42. The axial slot 50 extends axially from the base portion 30a of the tray 30 to a top of the outer wall 30b of the tray 30 and the retaining leaf arrangement 32. The axial slot 50 also extends through the outer wall 30b and the retaining leaf arrangement 32 such that, when the cable 42 is not placed in the packing module 20, the packing module 20 is open from outside the packing module 20 to the central axis 40. Each leaf 34 is formed as a non-continuous structure in which each leaf 34 has ends that define a space therebetween. For example, each leaf 34 may be formed as a non-continuous ring. The openings of the plurality of leaves 34 together form the axial slot 50. As shown in FIG. 3, the openings between the ends of each leaf 34 may gradually widen along the retaining leaf arrangement 32 away from the central axis 40. The leaves 34 may be formed to define a tapering or v-shaped axial slot 50 that widens away from the central axis 40.

Figure 5:
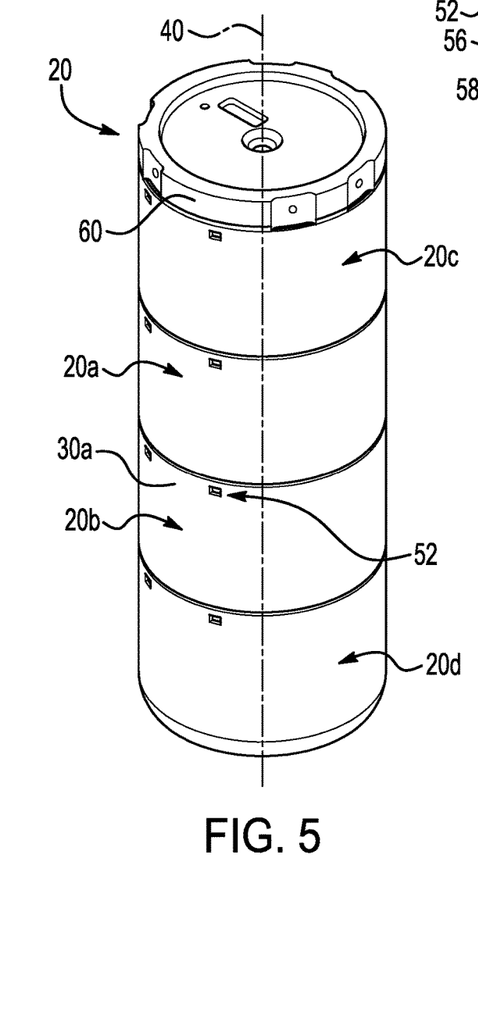
FIG. 5 shows an oblique view of another side of the packing module of FIG. 1.
Figure 6:
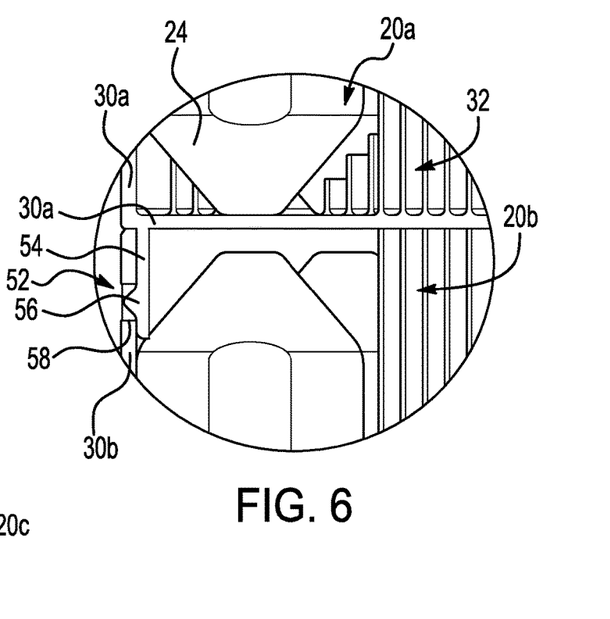
FIG. 6 shows a detailed sectional view of the packing module of FIG. 1 illustrating an interlocking engagement between adjacent sub-modules of the packing module.
Figure 7:
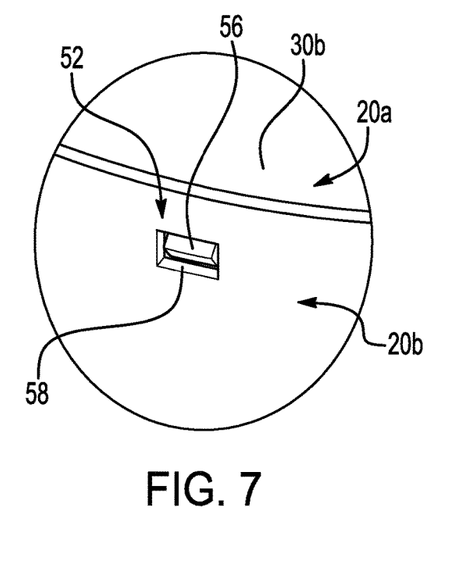
FIG. 7 shows a detailed view of the interlocking engagement between the sub-modules of FIG. 6.
Figure 8:
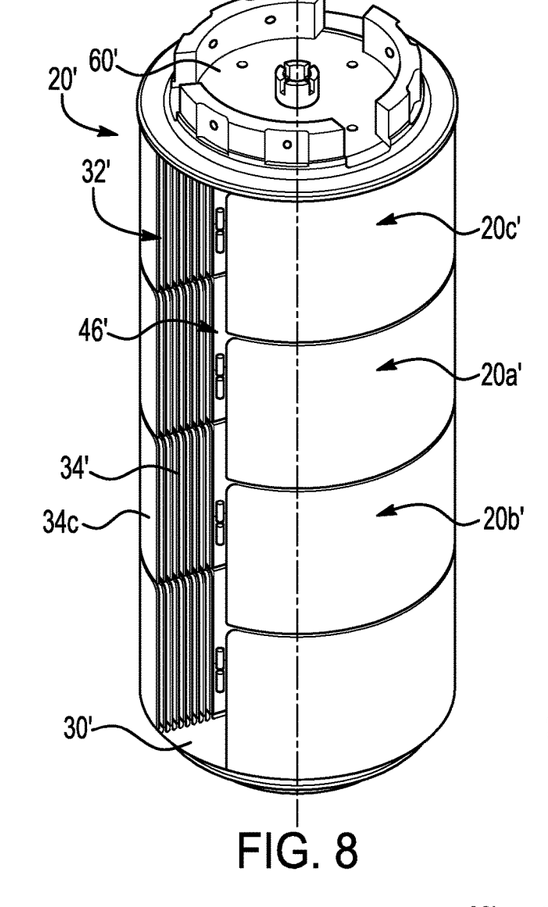
FIG. 8 shows an oblique view of a packing module for a sensor array according to another exemplary embodiment of the present application.
Figure 9:
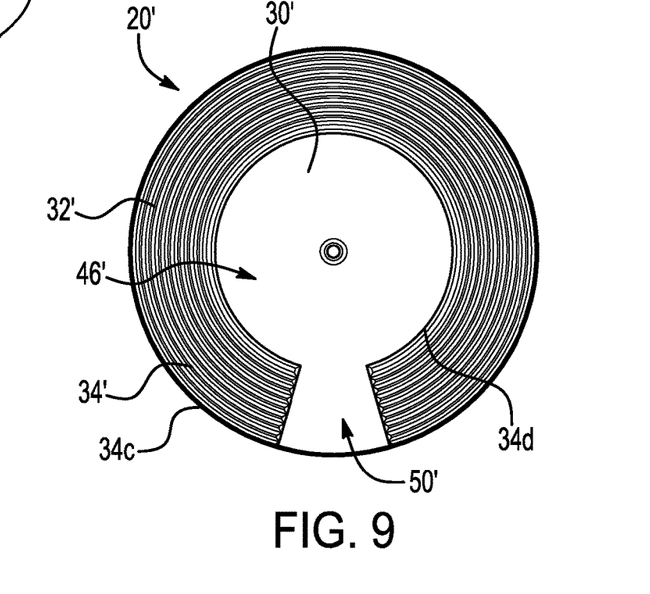
FIG. 9 shows a top view of a sub-module of the packing module of FIG. 8.
Figure 10:
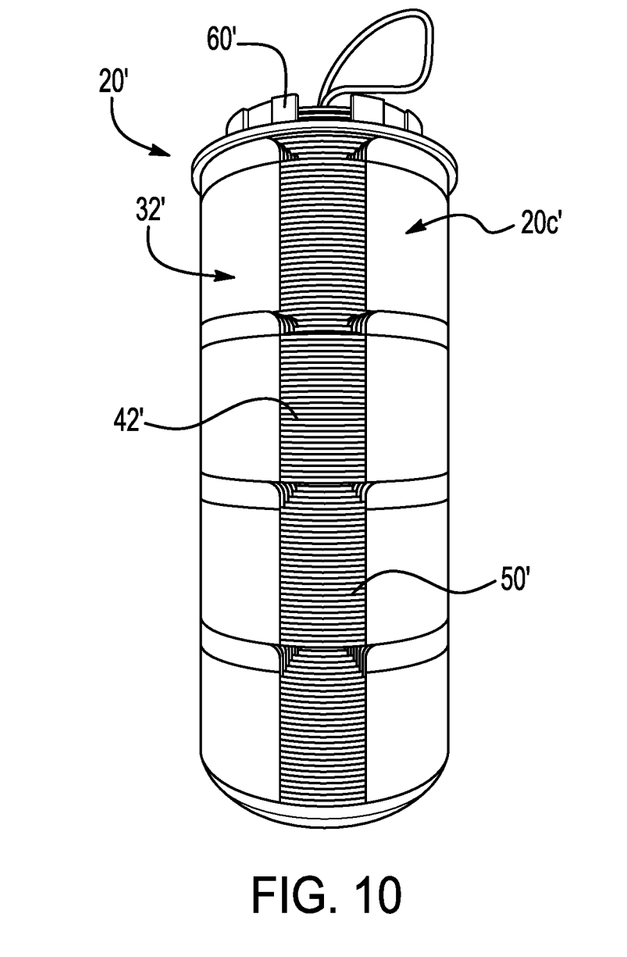
FIG. 10 shows a side view of the packing module of FIG. 8 accommodating the sensor array.
Figure 11:
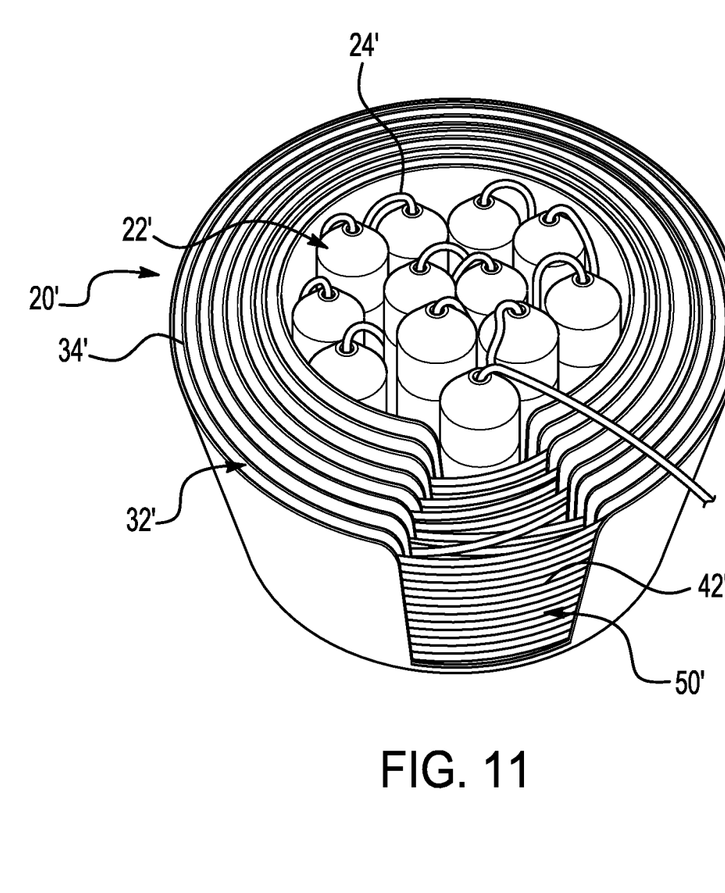
FIG. 11 shows a top oblique view of the packing module of FIG. 8 accommodating the sensor array.

Referring in addition to FIGS. 5-7, the packing module 20 is modular such that more than one tray 30 and retaining leaf arrangement 32 may be axially stacked to accommodate the sensor array 22. One tray 30 and a corresponding retaining leaf arrangement 32 may form a sub-module 20a, 20b, 20c, 20d such that the sub-modules 20a, 20b, 20c, 20d together form the packing module 20. The sub-modules 20a, 20b, 20c, 20d may be vertically stacked such that a first sub-module 20a is an upper sub-module 20a and an adjacent sub-module 20b is a lower sub-module, such as when the sensor array 22 is deployed in the ocean. In the exemplary embodiment shown in FIG. 5, four sub-modules 20a, 20b, 20c, 20d are stacked, but less than four or more than four sub-modules 20a, 20b, 20c, 20d may be stacked in other embodiments.

All of the trays 30 and leaf arrangements 32 in the sub-modules 20a, 20b, 20c, 20d may be identical or nearly identical in shape and size. Each sub-module 20a, 20b, 20c, 20d may be formed to accommodate a same number of sensors 24. During deployment, sensors 24 in the sub-modules 20a, 20b, 20c, 20d may be sequentially deployed. For example, the sensors 24 in the sub-modules 20a, 20b, 20c, 20d may be deployed, starting from the sensors 24 retained in an uppermost sub-module 20c and deploying the sensors 24 in each sub-module until the sensors 24 in a lowermost sub-module 20d are deployed, or vice versa, starting from a lowermost sub-module 20d. In other exemplary applications, the sequential deployment may occur in a horizontal direction rather than vertically.

When the sub-modules 20a, 20b, 20c, 20d are assembled to each other, each tray 30 is secured to an adjacent tray 30 via any suitable interlocking feature 52, fastener, or securing mechanism. The interlocking feature 52 may be arranged on a side of the sub-module 20a, 20b, 20c, 20d that is opposite to where the axial slot 50 (shown in FIGS. 1 and 3) is formed. As shown in FIG. 1, each sub-module 20a, 20b, 20c, 20d may have an axial slot 50 such that an entire side of the packing module 20 has a continuous opening between the axial ends of the packing module 20.

As best shown in FIG. 6, each tray 30 may include an axially extending interlocking tab 54 that protrudes in a normal direction relative to the tray 30 and in an opposite direction relative to the direction in which the retaining leaf arrangement 32 extends relative to the tray 30. The interlocking tab 54 may be integrally formed with the tray 30 and is flexible to provide a releasable connection. A protrusion 56 extends outwardly from the interlocking tab 54 relative to the central axis 40 of the packing module 20. The protrusion 56 is configured to flexibly engage in a corresponding notch 58 that is formed at an axial end of the adjacent tray 30.

As shown in FIG. 6, a first or upper sub-module 20a includes the tray 30 having the interlocking tab 54 that engages in the notch 58 of the tray 30 of the adjacent or lower sub-module 20b. When the protrusion 56 is engaged in the notch 58, the interlocking tab 54 extends along an inner surface of the outer wall 30b of the tray 30 of the lower sub-module 20b. The interlocking tab 54 extends from the tray 30 at a location along the tray 30 that is displaced from the outer wall 30b such that the outer walls 30b of the trays 30 of all the sub-modules 20a, 20b are continuous to define the outer surface of the packing module 20.

The adjacent trays 30 of the sub-modules 20a, 20b may be secured via a snap-fit connection provided by the engagement between the protrusion 56 and the notch 58. Using the interlocking tabs 54 is advantageous in that the sub-modules 20a, 20b are releasably secured to each other to enable quick connection and disconnection. During deployment of the sensor array 22, the trays 30 may be quickly disengaged from each other after each tray 30 is emptied of the sensors 24. Other suitable fasteners for securing the trays 30 may include quick couplers, bayonet connectors, clasps, clamps, screws, retaining rings, threaded connections, or any other connector mechanism. A cover plate 60 may also be arranged at an axial end of the packing module 20 and secured to an uppermost sub-module 20c for connecting the assembled packing module 20 to a deployment mechanism or platform. Interlocking tabs may also be used for securing the cover plate 60 to the uppermost sub-module 20c.

Referring now to FIGS. 8-11, a packing module 20' according to another embodiment is shown. The packing module 20' includes the retaining leaf arrangement 32' being spaced from the central axis 40' of the packing module 20' and defines an inner cavity 46' for accommodating the sensors 24' of the sensor array 22'. The retaining leaf arrangement 32' extends outwardly from the tray 30' or normal to the tray 30' and includes a plurality of nested leaves 34' that are similar to the leaves 34' shown in FIGS. 1-3. The packing module 20' shown in FIGS. 8-11 may be more suitable for a sensor array 22' having a smaller ratio between an outer diameter of the sensors 24' and the cable 42', i.e. for larger cables, whereas the packing module 20 shown in FIGS. 1-3 may be more suitable for a sensor array 22 having a larger ratio between the outer diameter of the sensors 24 and the cable 42, i.e. for smaller cables.

As the retaining leaf arrangement 32' is arranged proximate an outer perimeter of the tray 30' and each leaf 34' has a larger outer perimeter as compared with the leaves 34 shown in FIGS. 1-3, fewer retaining leaves 34' may be provided. For example, less than 10 retaining leaves 34' may be provided. The number of retaining leaves 34' is dependent on the size of the sensor array 22' such that more than 10 retaining leaves 34' may be provided for particular applications. The tray 30' is configured to support the sensors 24' and the retaining leaf arrangement 32' is configured to retain the cable 42' separately from the sensors 24'. In the packing module 20', the outer wall 30b of the tray 30' may form the outer perimeter of the packing module 20', as shown in FIGS. 1-3, or an outermost leaf 34c of the retaining leaf arrangement 32' may form the outer perimeter of the packing module 20'. Either the outer wall 30b or the outermost leaf 34c may include the interlocking tab 54 shown in FIGS. 5-7.

Packing the packing module 20' may be performed similarly to the packing method for the packing module 20 in that the sensor 24' are placed on the tray 30' separately and in succession. A first sensor 24' is placed on the tray 30' in the inner cavity 46', a portion of the cable 42' is placed in an innermost leaf 34d of the retaining leaf arrangement 34', another sensor 24' is placed in the inner cavity 46', and the steps are repeated until the entire sensor array 22' and cable 42' is accommodated in the packing module 20'. In the assembled packing module 20', the sensors 24' are packed together in the inner cavity 46' and the cable 42' surrounds the packed sensors 24', in contrast to the packing module 20 in which the sensors 24 surround the cable 42. Deployment of the packing module 20' may also be performed similarly to the deployment method for the packing module 20 in that a sensor 24' may be deployed from the inner cavity 46', a portion of the cable 42' may be unwrapped and removed from the retaining leaf arrangement 34' until another sensor 24' is deployed from the inner cavity 46', and so on, until all of the sensors 24' and an entirety of the cable 42' is displaced from the packing module 20'.

The packing module 20' may include an axial slot 50' that is similar to the axial slot 50 of the packing module 20 and opens to the cable 42' to enable access to the cable 42' when the cable 42' is retained in the retaining leaf arrangement 32'. The axial slot 50' extends through the retaining leaf arrangement 32' to the inner cavity 46' and may have a tapered shape such that the axial slot 50' tapers inwardly toward the central axis 40' of the packing module 20'. The packing module 20' may be modular such that a plurality of sub-modules 20a', 20b', 20c' that each include a tray 30' and a retaining leaf arrangement 32' are axially stacked to form the packing module 20'. In an exemplary embodiment, the packing module 20' may be cylindrical and the sub-modules 20a', 20b', 20c' may be vertically stacked. An uppermost sub-module 20c' may be secured to a cover plate 60' that is used to connect the packing module 20' to a deployment device or platform.

Figure 12:
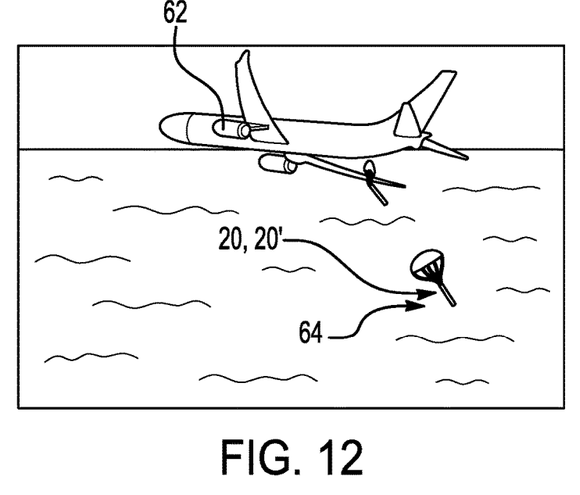
FIG. 12 shows an exemplary application in which a sonobuoy is deployed from a platform and includes the packing module of FIG. 1 or FIG. 8.
Figure 13:
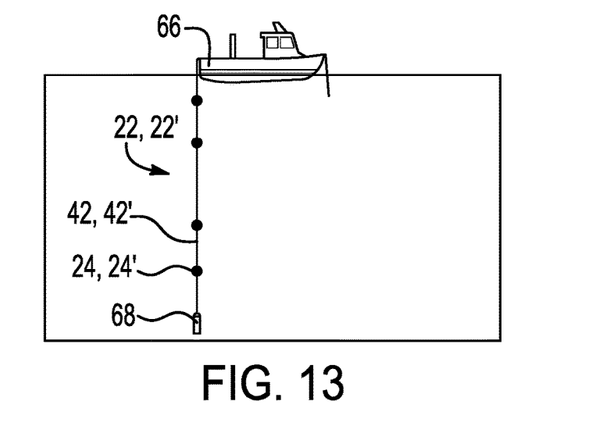
FIG. 13 shows an exemplary application in which the sensor array is deployed from the packing module of FIG. 1 or FIG. 8.

Referring now to FIGS. 12 and 13, exemplary applications for the packing module 20, 20' are shown. FIG. 12 shows the packing module 20, 20' being deployed from a platform 62 that is shown as an aircraft. In other exemplary applications, the platform 62 may be a sea vessel or land vehicle. The packing module 20, 20' may be arranged in a sonobuoy 64 that is deployed from the platform 62. FIG. 13 shows the deployed sensor array 22 being after deployment from a sea vessel 66. The sensor array 22 may be a hydrophone line array. The sensor array 22 is deployed from the packing module 20, 20' and includes the sensors 24 connected by the cable 42.

In an exemplary application, prior to the subsequent deployment of the sensor array 22, the sonobuoy 64 including the packing module 20, 20' is deployed by the platform 62, such as the aircraft shown in FIG. 12, toward the water 66. A buoyant portion of the sonobuoy 64, or the sea vessel 64 if deployment of the packing module 20, 20' occurs from the seal vessel 64, remains on the surface of the water 66 and a weighted portion 68 of the sonobuoy 64 is displaced and travels downwardly to deploy the sensor array 22, such that the packing module 20, 20' is in a vertical orientation during deployment. The sensor array 22 is operable for the intended application after being deployed from the packing module 20, 20'.

Figure 14:
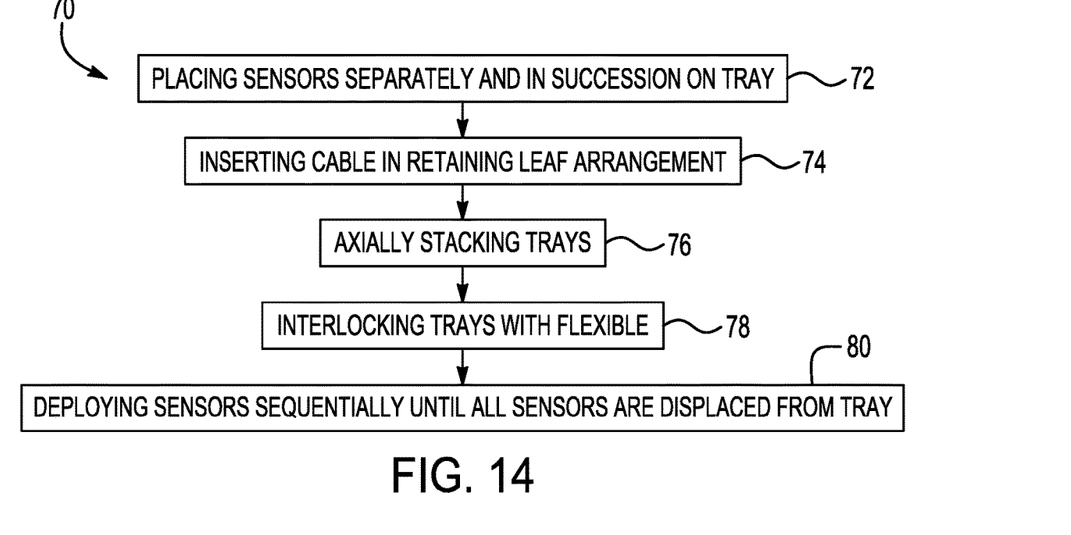
FIG. 14 shows a flowchart illustrating a method of packing and deploying a sensor array using the packing module of FIG. 1 or FIG. 8.

Referring now to FIG. 14, a flowchart illustrating a method 70 of packing and deploying a sensor array, such as a hydrophone line array, having a plurality of sensors connected by a cable is shown. The method 70 may be performed using the packing module 20, 20' described herein and shown in any of FIGS. 1-11. Step 72 of the method 70 includes placing a plurality of sensors 24, 24' separately and in succession on a tray 30, 30' configured to support the plurality of sensors 24, 24'. Step 74 of the method includes inserting the cable 42, 42' in a retaining leaf arrangement 32, 32' that extends outwardly from the tray 30, 30' or normal to the tray 30, 30' in between each placing of one of the plurality of sensors 24, 24'. Step 74 may include sequentially wrapping the cable 42, 42' around a plurality of leaves 34, 34' that are nested.

Step 76 of the method 70 includes axially stacking a plurality of trays 30, 30' that each support a set of the plurality of sensors 24, 24', such as the trays 30, 30' of different sub-modules 20a, 20b, 20c, 20d, 20a', 20b', 20c'. Step 78 of the method 70 includes interlocking adjacent trays 30, 30' via flexible interlocking tabs 54. Step 80 of the method 70 includes deploying the sensor array 22, 22'. Step 80 includes alternately releasing one of the plurality of sensors 24, 24' and removing the cable 42, 42' from the retaining leaf arrangement 32, 32' until all of the plurality of sensors 24, 24' and the entirety of the cable 42, 42' are displaced from the tray 30, 30'.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A packing module for a sensor array having a plurality of sensors connected by a cable, the packing module comprising:
at least one tray configured to support the plurality of sensors; and
a retaining leaf arrangement that includes a plurality of leaves that are nested, that extends from the at least one tray, and that is configured to retain the cable on the at least one tray separately from the plurality of sensors.

2. The packing module according to claim 1, wherein the plurality of leaves are evenly spaced relative to each other.

3. The packing module according to claim 1, wherein each of the plurality of leaves have a same thickness and a same axial height relative to the at least one tray.

4. The packing module according to claim 1, wherein each of the plurality of leaves has a progressively increasing outer perimeter in a direction away from a central axis of the retaining leaf arrangement.

5. The packing module according to claim 1, wherein the at least one tray includes a plurality of trays that are axially stacked and are each configured to support a same predetermined number of the plurality of sensors.

6. The packing module according to claim 5 further comprising a plurality of flexible interlocking tabs that secure one of the plurality of trays to an adjacent one of the plurality of trays.

7. The packing module according to claim 6, wherein each of the flexible interlocking tabs is formed integrally with a corresponding one of the plurality of trays.

8. The packing module according to claim 6, wherein the packing module defines an axial slot extending through the retaining leaf arrangement for accessing the cable.

9. The packing module according to claim 6, wherein the at least one tray includes an outer wall and the retaining leaf arrangement includes a plurality of inner leaves that define a cavity between the outer wall and the plurality of inner leaves, wherein the cavity is configured to receive the plurality of sensors.

10. The packing module according to claim 9, wherein the cavity has an axial width that is at least ten times greater than a spacing between leaves of the retaining leaf arrangement.

11. The packing module according to claim 1, wherein the retaining leaf arrangement defines an interior cavity that is surrounded by the retaining leaf arrangement and configured to receive the plurality of sensors.

12. The packing module according to claim 1, wherein the tray and the leaf arrangement are integrally formed as a monolithic body.

13. The packing module according to claim 1, wherein the at least one tray and the retaining leaf arrangement are cylindrical in shape.

14. The packing module according to claim 13, wherein the retaining leaf arrangement includes a plurality of concentrically arranged leaves that each have a progressively increasing diameter in a radially outward direction.

15. A packing and deployment system for a hydrophone array having a plurality of sensors connected by a cable, the packing and deployment system comprising:
a plurality of axially stacked trays that are each configured to support a set of the plurality of sensors, wherein the plurality of axially stacked trays are releasably connected to each other; and
a plurality of retaining leaf arrangements that each include a plurality of leaves that are nested, and that are each arranged on a corresponding one of the plurality of vertically stacked trays and extend from the one of the plurality of vertically stacked trays, wherein each of the plurality of retaining leaf arrangements is configured to retain the cable on the corresponding one of the plurality of vertically stacked trays separately from the plurality of sensors.

16. A method of packing and deploying a sensor array having a plurality of sensors connected by a cable, the method comprising:
placing a plurality of sensors separately and in succession on a tray configured to support the plurality of sensors; and
inserting the cable in a retaining leaf arrangement that extends from the tray in between each placing of one of the plurality of sensors, the retaining leaf arrangement including a plurality of leaves that are nested, and being configured to retain the cable separately from the plurality of sensors.

17. The method according to claim 16, wherein inserting the cable in the retaining leaf arrangement includes sequentially wrapping the cable around a plurality of leaves that are nested.

18. The method according to claim 16 further comprising:
axially stacking a plurality of trays that each support a set of the plurality of sensors; and
interlocking the plurality of trays flexible interlocking tabs.

19. The method according to claim 16 further comprising deploying the sensor array, wherein the deploying includes alternately releasing one of the plurality of sensors and removing the cable from the retaining leaf arrangement until all of the plurality of sensors and an entirety of the cable are displaced from the tray.

\* \* \* \* \*